United States Patent Office 3,072,565
Patented Jan. 8, 1963

3,072,565
SEPARATION PROCESS USING AN AMINO DI-ACID ESTER
Earle C. Makin, Jr., El Dorado, Ark., assignor to Monsanto Chemical Company, St. Louis, Mo., a corporation of Delaware
No Drawing. Filed May 20, 1960, Ser. No. 30,423
14 Claims. (Cl. 208—236)

The present invention relates to the separation of mixtures of two or more compounds by means of a selective solvent. More particularly, this invention relates to the separation of mixtures containing hydrocarbons of varying degrees of saturation by means of solvents selective for the less saturated hydrocarbons.

Whenever mixtures of organic compounds having approximately the same volatilities are encountered, separation by distillation becomes very difficult or, in many cases, impossible. To fill the gap left by this deficiency of distillation, solvent extraction, extractive distillation, and azeotropic distillation have been developed. These three methods have in common the addition of an outside solvent for the purpose of aiding separation. Only two of these actually depend on the solvent characteristics of a given solvent, however. These are solvent extraction and extractive distillation. Since the solvent is the key to these two separation methods there is a continuous search for new and improved solvents.

It is an object of this invention to provide a method for the separation of mixtures of two or more compounds by means of a selective solvent. Another object of this invention is to provide a method for the separation of substantially saturated hydrocarbons from those less saturated hydrocarbons contained in mixtures thereof, by extraction with a particular selective solvent. A further object of this invention is to provide a new and improved solvent for the separation of compounds according to their degree of saturation. A more specific object of this invention is to separate saturated from unsaturated hydrocarbons through the use of a new and improved selective solvent, said solvent being selective for the unsaturated hydrocarbons. Additional objects will become apparent from the description of the invention herein disclosed.

In fulfillment of the objects of this invention it has been found that amino diacid derivatives have utility as selective solvents for separating mixtures of two or more compounds. A particularly effective class of selective solvents have the general formula

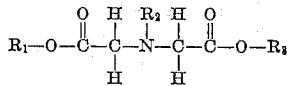

wherein $R_1$, $R_2$ and $R_3$ contain 1 to 10 carbon atoms and are selected from the group consisting of hydrocarbon radicals, oxygen containing hydrocarbon radicals, nitrogen containing hydrocarbon radicals, sulfur containing hydrocarbon radicals and halogen containing hydrocarbon radicals. When $R_1$, $R_2$ and $R_3$ are hydrocarbon radicals they may be aliphatic, alicyclic, aromatic or mixed. The oxygen bearing portion of the oxygen containing hydrocarbon radicals may be a radical chosen from the group comprised of hydroxy, ether, aldehyde, ketone, acid and ester radicals. Sulfur bearing radicals include sulfides, sulfoxides and sulfones. The nitrogen bearing radicals include amines, nitriles, and nitro radicals. The hydrocarbon radicals may also be substituted with more than one of the elements from the group comprised of O, N, S and X where X is a halogen. It is also within the scope of this invention that derivatives of amino diacids other than that exemplified by the above formula may be effective as selective solvents. Such other amino acids would include amino diproprionic acid, amino dibutanoic acid, propionic amino acetic acid, etc.

The following examples are given to illustrate the invention herein disclosed. It is to be understood that these examples are not to be construed as limiting the application, conditions or operations of this invention.

Example I

Two mls. of diallyl (ethylimino) diacetate were placed in a U-shaped tube containing ⅛ inch diameter glass beads. Forty mls. of a $C_4$ hydrocarbon stream containing 2.3 volume percent isobutanes, 58.1 volume percent n-butane, 18.0 volume percent butenes, and 21.6 volume percent butadiene-1,3 were passed back and forth through the solvent at room temperature (approximately 25° C.) and at slight positive pressure until an equilibrium volume of unabsorbed gas was obtained. The unabsorbed gas was then analyzed and found to contain only 12.3 volume percent butadiene-1,3. The amount of the $C_4$ feed which was absorbed in the solvent was approximately 17 mls.

Example II

Two mls. of diethyl (ethylimino) diacetate were placed in a U-shaped tube containing ⅛ inch diameter glass beads. Forty mls. of a $C_4$ hydrocarbon stream containing 2.3 volume percent isobutanes, 58.1 volume percent n-butane, 18.0 volume percent butenes, and 21.6 volume percent butadiene-1,3 were passed back and forth through the solvent until an equilibrium volume of unabsorbed gas was obtained. The unabsorbed gas was then analyzed and found to contain only 11.8 volume percent butadiene-1,3. The amount of the $C_4$ feed which was absorbed in the solvent was approximately 20 mls.

Example III

A hydrocarbon mixture comprising aromatic hydrocarbons and non-aromatic hydrocarbons within the boiling range of 60–100° C. is thoroughly agitated in a single stage batch mixing apparatus with diethyl(ethylimino)diacetate. The ratio of solvent to hydrocarbon mixture is 2:1. On ceasing the agitation, a raffinate and extract phase forms. The raffiniate phase contains a greater concentration of the non-aromatic hydrocarbons than did the initial mixture.

Example IV

A hydrocarbon mixture comprising 50 weight percent n-hexane and 50 weight percent hexene-1 is thoroughly agitated in a single stage batch mixing apparatus with diallyl(ethylimino)diacetate. The ratio of solvent to hydrocarbon mixture is 3:1. On ceasing agitation, a raffinate and extract phase is formed. The raffinate phase contains a greater concentration of n-hexane than did the initial mixture.

Example V

An organic mixture comprising a hydrocarbon fraction boiling in the gasoline range and 4 percent by weight of sulfur as sulfur bearing compounds is subjected to thorough agitation with diethyl(ethylimino)diacetate in a ratio of 2 parts by volume of the solvent per volume of organic mixture. The agitation is ceased and a raffinate and extract phase allowed to form. The raffinate phase is found to contain appreciably less sulfur as sulfur bearing compounds than did the initial organic mixture.

Example VI

An organic mixture comprising a hydrocarbon fraction boiling in the range 100 to 225° C. and 7 percent by weight nitrogen as nitrogen bearing compounds is subjected to thorough agitation with diallyl (ethylimino) diacetate in a ratio of 4 parts by volume of the solvent per volume of organic mixture. The agitation is ceased and a raffinate and extract phase allowed to form. The raffinate phase is found to be substantially lower in nitrogen content than the initial organic mixture.

Example VII

A hydrocarbon mixture comprising methylcyclohexane and n-heptane in a 1:1 by volume ratio is subjected to thorough agitation with diethyl (ethylimino) diacetate in a ratio of 5 parts by volume of the solvent per volume of the hydrocarbon mixture. The agitation is ceased and a raffinate and extract phase allowed to form. The raffinate phase is found to be lower in concentration of methylcyclohexane than the initial hydrocarbon mixture.

Example VIII

A hydrocarbon mixture comprising toluene and n-heptane in a 1:1 volume ratio is subjected to thorough agitation with diallyl (ethylimino) diacetate in a ratio of 2 parts by volume of the solvent per volume of the hydrocarbon mixture. The agitation is ceased and a raffinate and extract phase allowed to form. The raffinate phase is found to be substantially lower in concentration of toluene than the initial hydrocarbon mixture.

Example IX

A hydrocarbon mixture comprising 1-methyl naphthalene and 1,3,5 triethyl benzene in a 1:1 by volume ratio is subjected to thorough agitation with diethyl (ethylimino) diacetate in a ratio of 3 parts by volume of the solvent per volume of the hydrocarbon mixture. The agitation is ceased and a raffinate and extract phase allowed to form. The raffinate phase is found to be substantially lower in concentration of 1-methyl naphthalene than the initial hydrocarbon mixture.

Example X

A hydrocarbon mixture comprising hexadiene-1,3 and hexene-1 in a 1:1 by volume ratio is subjected to thorough agitation with diallyl (ethylimino) diacetate in a ratio of 2 parts by volume of the solvent per volume of the hydrocarbon mixture. The agitation is ceased and a raffinate and extract phase allowed to form. The raffinate phase is found to be substantially lower in concentration of hexadiene-1,3 than the initial hydrocarbon mixture.

The compounds which are the subjects of this invention are the derivatives of amino diacetic acid whose formula is

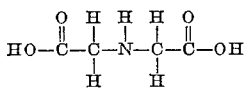

These diamino diacetic acid derivatives are those which have had substituted thereto hydrocarbon radicals or hydrocarbon radicals containing O, N, S, or X, where X is a halogen. The substituent groups are placed on the amino diacetic acid structure with the removal of the hydrogens of the hydroxy groups and the hydrogen of the amine group.

Many different types of mixtures of compounds may be separated by the selective solvents of this invention, provided the mixtures are inert toward the solvent and the solubility characteristics of one or more of the components of the mixture is altered in regard to the other components. Thus, the solvents of this invention may be effective in the isolation of pure compounds, the separation of mixtures of organic compounds of different degrees of saturation such as aromatics, olefins, polyolefins, naphthalenes and/or paraffins from various hydrocarbon mixtures containing them, and various purification processes, such as desulfurization, separation of oxygen containing compounds, nitrogen bearing compounds, and halogen compounds from mixtures containing them. Some specific non-limiting examples of mixtures which may be separated by the solvents of this invention are hydrocarbon mixtures such as ethane and ethylene; propane and propylene, butane, isobutane, alpha-, beta- and iso-butylenes, butadiene, vinyl acetylene, ethyl acetylene; pentanes, pentenes, isoprene and piperylene; hexanes and hexenes; gasoline distillates containing benzene, toluene, xylenes, ethyl benzene, mesitylene, cumene, etc.; ortho and para-xylene; naphthenes and paraffins; gasoline; kerosene; fuel oils; lubricating oils; halogenated hydrocarbons including ortho and para-chloronitrobenzene; those of organic substances containing water, such as aqueous alcohols including methyl, ethyl, propyl and ortho alcohols; glycols; glycerines; chlorhydrins; organic acids including acetic, propionic and lactic acids; esters including isopropyl acetate; ortho and para-nitrophenol; ortho and para-methoxy phenol; ortho and para-dihydroxy benzene; glycol chlorhydrin and glycol; glycol and glycol ethers; ethyl acetate and ethyl alcohol; nitroglycerine and glycerine; primary and secondary butyl alcohols; alkyl phenols such as ortho, meta and para-cresols; ortho and para-hydroxy benzaldehyde; ortho and para-ethoxy aniline; methyl propyl ketone and diethyl ketone; mixtures of resorcin, catechol and hydroquinone; terpenes or sesquiterpenes from oxygen-containing compounds such as alcohols or aldehydes present therein; etc.

The solvents of this invention may be utilized as selective solvents alone or in combination with one another. Also, these solvents may be used in conjunction with other known solvents, selective solvents and/or modifying agents. Non-limiting examples of such auxiliary solvents are water, methanol, ethanol, and higher alcohols, benzyl alcohol, furfuryl alcohol, glycols, glycerols, acetones and other ketones, crotonaldehyde, furfural, and other aldehydes, nitriles, ethers, nitro hydrocarbons, and as modifying agents, propane, butane, pentane, hexane, heptane, and others.

If auxiliary solvents are used, the amount employed may vary over wide ranges as from 0 to 95 percent by volume but with a more preferred amount being from 0 to 40 percent by volume.

Not only do the solvents of this invention possess utility in separation by solvent extraction but they find equal application in extractive distillation. Extractive distillation is vapor-liquid solvent extraction and the two may be practically synonomous when speaking of systems wherein the mixture being separated is in the gaseous state at ordinary temperatures. The principle upon which separation is based is the affinity of the solvent for one or more compounds of a mixture over the other compound of the mixture.

In the practice of the present invention, the temperature at which a separation is carried out may range broadly from the freezing point of the solvent up to its decomposition temperatures. For an economically attractive process, it is desired that the optimum temperature range be approximately the ambient temperature and that slight variations in temperature cause little or no noticeable change in selectivity of the solvent or in the solvent loading characteristics. In general, the temperature at which the mixture to be separated is contacted with the solvent is in the range from about 40° to about 150° F. A preferred temperature range for the solvents of this invention is 50 to 100° F. However, it is to be understood that the preferred temperature range will be greatly dependent upon the mixture being separated. Little difficulty will be experience by those skilled in the art in determining the optimum temperature for any of the separations possible within the scope of this invention.

If the separation desired may be obtained more readily by extractive distillation than by solvent extraction with the solvents of this invention, then it may be necessary to use higher temperatures. The temperature will range between being above the bubble temperature of the mixture being separated and below the boiling point of the solvent. Suitable temperatures for the utilization of the solvents herein disclosed in extractive distillation processes may range from 0° C. or the bubble temperature of the mixture up to approximately 300° C. at pressures from 0.1 p.s.i.a. to 500 p.s.i.a. or higher.

The amount of solvent to be used in the application of the solvents of this invention to solvent extraction and extractive distillation may range from about 0.1 to 20 parts by volume of solvent per volume of the mixture to be separated. A more preferred ratio of solvent to mixture is approximately 1 to 10 parts by volume of solvent per volume of mixture.

The technique of contacting the solvents of this invention with the mixture to be separated may be any conventional method known for solvent extraction or extractive distillation which is adaptable to the physical characteristics of these solvents. The method of contact may be batchwise, concurrent, countercurrent or variations of these.

What is claimed is:

1. The process of separating mixtures of organic compounds, said mixtures being selected from the group consisting of (A) mixtures of at least two hydrocarbon compounds of different degrees of saturation, said hydrocarbons being selected from the group consisting of normally gaseous and normally liquid hydrocarbons, and (B) mixtures of naphthenes and paraffins, said process comprising contacting said mixture with a selective solvent having the formula

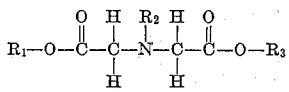

wherein $R_1$, $R_2$ and $R_3$ are alkyl radicals having from 1 to 10 carbon atoms in an amount sufficient to cause formation of an extract and a raffinate phase, and separating said extract and raffinate phases.

2. The process according to claim 1 wherein the selective solvent is a derivative of the group consisting of amino diacetic acid, amino dipropionic acid, amino dibutanoic acid, acetic amino propionic acid, acetic amino butanoic acid, propionic amino butanoic acid, and amino dipentanoic acid.

3. The process according to claim 1 wherein the selective solvent is diallyl (ethylimino) diacetate.

4. The process according to claim 1 wherein the selective solvent is diethyl (ethylimino) diacetate.

5. The process according to claim 1 wherein the mixture of at least two hydrocarbon compounds of different degrees of saturation contains olefinic hydrocarbons and paraffinic hydrocarbons.

6. The process according to claim 1 wherein the mixture of at least two hydrocarbon compounds of different degrees of saturation contains aromatic hydrocarbons and non-aromatic hydrocarbons.

7. The process according to claim 1 wherein the mixture of at least two hydrocarbon compounds of different degrees of saturation contains mono-olefinic hydrocarbons and poly-olefinic hydrocarbons.

8. The process of claim 1 wherein said mixture of naphthenes and paraffins is a mixture containing methylcyclohexane and n-heptane.

9. The process of refining mixtures of hydrocarbon fractions and non-hydrocarbon impurities selected from the group consisting of sulfur-bearing and nitrogen-bearing organic compounds, said process comprising contacting said mixture with a selective solvent having the formula

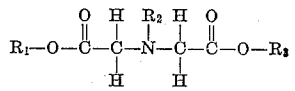

wherein $R_1$, $R_2$ and $R_3$ are alkyl radicals having from 1 to 10 carbon atoms in an amount sufficient to cause formation of an extract and a raffinate phase and separating said extract and raffinate phases.

10. The process according to claim 1 wherein the mixture to be separated is contacted with the selective solvent at elevated temperatures such that the mixture of two or more organic compounds is above its bubble point but that the temperature is below the boiling point of the selective solvent.

11. The process according to claim 1 wherein the mixture to be separated is contacted with the selective solvent at a temperature between 40 and 150° F.

12. The process according to claim 1 wherein the mixture of at least two hydrocarbon compounds of different degrees of saturation consists essentially of normal butane, iso-butane, butenes, and butadiene.

13. The process according to claim 1 wherein the ratio of selective solvent to mixture is 0.1 to 20 volumes of solvent per volume of mixture.

14. The process according to claim 1 wherein the ratio of selective solvent to mixture is 1 to 10 volumes of solvent per volume of mixture.

References Cited in the file of this patent

UNITED STATES PATENTS

| | | |
|---|---|---|
| 2,054,050 | Clark | Sept. 8, 1936 |
| 2,191,767 | McCluer et al. | Feb. 27, 1940 |
| 2,274,831 | Hill | Mar. 3, 1942 |
| 2,370,530 | Gage | Feb. 27, 1945 |